United States Patent
Guo et al.

(10) Patent No.: US 10,354,478 B2
(45) Date of Patent: Jul. 16, 2019

(54) METHOD, APPARATUS, AND SYSTEM FOR AUTOMATIC REFUELING OF DRIVERLESS VEHICLE

(71) Applicant: Baidu Online Network Technology (Beijing) Co., Ltd., Beijing (CN)

(72) Inventors: Xiaoyan Guo, Beijing (CN); Kelei Li, Beijing (CN); Cuijuan Xiao, Beijing (CN); Hang Zhang, Beijing (CN); Yuanyuan Zheng, Beijing (CN)

(73) Assignee: BAIDU ONLINE NETWORK TECHNOLOGY (BEIJING) CO., LTD, Beijing (CN)

( * ) Notice: Subject to any disclaimer, the term of this patent is extended or adjusted under 35 U.S.C. 154(b) by 372 days.

(21) Appl. No.: 15/280,870

(22) Filed: Sep. 29, 2016

(65) Prior Publication Data
US 2017/0316635 A1 Nov. 2, 2017

(30) Foreign Application Priority Data
Apr. 28, 2016 (CN) .......................... 2016 1 0278646

(51) Int. Cl.
*B67D 7/04* (2010.01)
*B67D 7/14* (2010.01)
(Continued)

(52) U.S. Cl.
CPC ........... *G07F 15/001* (2013.01); *B60W 10/06* (2013.01); *B60W 10/08* (2013.01); *B60W 10/30* (2013.01);
(Continued)

(58) Field of Classification Search
CPC .... G07F 15/001; G06Q 10/047; B67D 7/145; B67D 7/348; B67D 7/0401; F02D 41/042;
(Continued)

(56) References Cited

U.S. PATENT DOCUMENTS 6,237,647 B1 * 5/2001 Pong .................... B67D 7/0401
141/231
6,338,008 B1 * 1/2002 Kohut ...................... B60S 5/02
235/381

(Continued)

FOREIGN PATENT DOCUMENTS

CN 105329192 A 2/2016

*Primary Examiner* — Michael J Zanelli
(74) *Attorney, Agent, or Firm* — Knobbe Martens Olson & Bear LLP

(57) ABSTRACT

The present application discloses at least a method, apparatus, and system for automatic refueling of a driverless vehicle. A specific implementation of the method includes: sending refueling request information when a fuel amount is lower than a preset value and a refueling condition is satisfied; receiving preselected gas station information corresponding to the refueling request information; determining, from the preselected gas station information, destination gas station information and driving route information of a destination gas station; sending refueling request information after arriving at the destination gas station based on the driving route information of the destination gas station; turning off an engine and/or an electric motor after receiving refueling permission information corresponding to the refueling request information, opening a fuel tank cap, and sending refueling confirmation information; and closing the fuel tank cap after receiving refueling completion information. This implementation improves the refueling efficiency.

18 Claims, 9 Drawing Sheets

(51) Int. Cl.
| | |
|---|---|
| B67D 7/34 | (2010.01) |
| G05D 1/00 | (2006.01) |
| B60K 15/05 | (2006.01) |
| B60W 10/06 | (2006.01) |
| B60W 10/08 | (2006.01) |
| B60W 10/30 | (2006.01) |
| B60W 20/00 | (2016.01) |
| F02D 41/04 | (2006.01) |
| G01C 21/36 | (2006.01) |
| G06Q 10/04 | (2012.01) |
| G07F 15/00 | (2006.01) |

(52) U.S. Cl.
CPC ........... *B60W 20/00* (2013.01); *B67D 7/0401* (2013.01); *B67D 7/145* (2013.01); *B67D 7/348* (2013.01); *F02D 41/042* (2013.01); *G05D 1/0088* (2013.01); *G06Q 10/047* (2013.01); *B60K 15/05* (2013.01); *B60K 2015/0538* (2013.01); *G01C 21/3679* (2013.01)

(58) Field of Classification Search
CPC ...... B60W 10/06; B60W 10/08; B60W 10/30; B60W 20/00; G05D 1/0088; G01C 21/3679; B60K 15/05; B60K 2015/0538
See application file for complete search history.

(56) References Cited

U.S. PATENT DOCUMENTS

| | | | |
|---|---|---|---|
| 2015/0348335 A1* | 12/2015 | Ramanujam | G07C 5/006 701/23 |
| 2016/0123754 A1* | 5/2016 | Li | G01C 21/3469 701/123 |
| 2016/0139600 A1* | 5/2016 | Delp | B67D 7/04 701/26 |
| 2016/0247143 A1* | 8/2016 | Ghosh | G06Q 20/3278 |

* cited by examiner

METHOD, APPARATUS, AND SYSTEM FOR AUTOMATIC REFUELING OF DRIVERLESS VEHICLE

CROSS REFERENCE TO RELATED APPLICATIONS

This application claims the priority of Chinese Patent Application No. 201610278646.5, entitled "Method, Apparatus, and System for Automatic Refueling of Driverless Vehicle," filed on Apr. 28, 2016, the content of which is incorporated herein by reference in its entirety.

TECHNICAL FIELD

The present application relates to the field of information processing technology, specifically to the field of vehicle control technology, and more specifically to a method, apparatus, and system for automatic refueling of a driverless vehicle.

BACKGROUND

Currently, most vehicles are still powered by gasoline. The vehicle consumes gasoline during driving, and the driver needs to find a gas station to refuel the vehicle before gasoline runs out. The wide distribution of gas stations makes it convenient for people to travel.

In real life, when a driver needs to refuel a vehicle, the common method is to find the nearest gas station. However, because there are often a large number of vehicles waiting for refueling at the gas station, the drivers usually need to queue to refuel the vehicles, and thus they cannot refuel the vehicle in time, but waste a lot of time. In contrast, some gas stations that can not be easiliy found or have few filling vehicles are often in an idle state. As a result, the vehicle refueling efficiency is rather low. The irregular distribution of gas stations aggravates the problem of low refueling efficiency, especially for those who drive to unfamiliar places.

SUMMARY

The present application provides a method, apparatus, and system for automatic refueling of a driverless vehicle, so as to solve the technical problem mentioned in the Background section.

According to a first aspect, the present application provides a method for automatic refueling of a driverless vehicle, comprising: sending refueling request information when a fuel amount is lower than a preset value and a refueling condition is satisfied, the refueling condition comprising at least one of: the vehicle is in a driverless state, and an instruction permitting automatic refueling is received; and the refueling request information comprising a vehicle identification number, vehicle location information, and information about drivable mileage using remaining fuel in the vehicle; receiving preselected gas station information corresponding to the refueling request information, the preselected gas station information comprising location information of a preselected gas station, driving route information of the preselected gas station, and refuel-queuing information of the preselected gas station corresponding to a refuel-queuing condition, the refuel-queuing condition comprising at least one of waiting time for refueling, a distance to the gas station, and time required to reach the gas station, and the refuel-queuing information comprising at least one of a number of idle automatic refueling terminals and a number of vehicles waiting for refueling; determining, from the preselected gas station information, destination gas station information and driving route information of a destination gas station; sending refueling request information after arriving at the destination gas station based on the driving route information of the destination gas station, the refueling request information comprising the vehicle identification number, refueling account information, and refueling amount information; turning off an engine and/or an electric motor after receiving refueling permission information corresponding to the refueling request information, opening a fuel tank cap, and sending refueling confirmation information; and closing the fuel tank cap after receiving refueling completion information.

According to a second aspect, the present application provides a method for automatic refueling of a driverless vehicle, comprising: receiving refueling request information, the refueling request information comprising a vehicle identification number, vehicle location information, and information about drivable mileage using remaining fuel in the vehicle; searching for preselected gas station information corresponding to the refueling request information; and sending the preselected gas station information.

According to a third aspect, the present application provides a method for automatic refueling of a driverless vehicle, comprising: receiving refueling request information, the refueling request information comprising a vehicle identification number, refueling account information, and refueling amount information; validating the vehicle identification number in the refueling request information by using a received refueling authorization information, and sending refueling permission information if the validation is passed; otherwise, sending alarm information; and refueling the vehicle based on the refueling account information and the refueling amount information after receiving a refueling confirmation message, and sending refueling completion information.

According to a fourth aspect, the present application provides an apparatus for automatic refueling of a driverless vehicle, comprising: a refueling request information sending unit, for sending refueling request information when a fuel amount is lower than a preset value and a refueling condition is satisfied, the refueling condition comprising at least one of: the vehicle is in a driverless state; and an instruction permitting automatic refueling is received, and the refueling request information comprising a vehicle identification number, vehicle location information, and information about drivable mileage using remaining fuel in the vehicle; a preselected gas station information receiving unit, for receiving preselected gas station information corresponding to the refueling request information, the preselected gas station information comprising location information of a preselected gas station, driving route information of the preselected gas station, and refuel-queuing information of the preselected gas station corresponding to a refuel-queuing condition, the refuel-queuing condition comprising at least one of waiting time for refueling, a distance to the gas station, and time required to reach the gas station, and the refuel-queuing information comprising at least one of a number of idle automatic refueling terminals and a number of vehicles waiting for refueling; a destination gas station determining unit, for determining, from the preselected gas station information, destination gas station information and driving route information of a destination gas station; a refueling request information sending unit, for sending refueling request information after arriving at the destination gas station based on the driving route information of the destination gas station, the refueling request information comprising the vehicle identification number, refueling account information, and refueling amount information; a refueling confirmation message sending unit, for turning off an engine and/or an electric motor after receiving refueling permission information corresponding to the refueling request information, opening a fuel tank cap, and sending refueling confirmation information; and a refueling completion unit, for closing the fuel tank cap after receiving refueling completion information.

According to a fifth aspect, the present application provides an apparatus for automatic refueling of a driverless vehicle, comprising: a refueling request information receiving unit, for receiving refueling request information, the refueling request information comprising a vehicle identification number, vehicle location information, and information about drivable mileage using remaining fuel in the vehicle; a preselected gas station information searching unit, for searching for preselected gas station information corresponding to the refueling request information; and a preselected gas station information sending unit, for sending the preselected gas station information.

According to a sixth aspect, the present application provides an apparatus for automatic refueling of a driverless vehicle, comprising: a refueling request information receiving unit, for receiving refueling request information, the refueling request information comprising a vehicle identification number, refueling account information, and refueling amount information; an information validating unit, for validating the vehicle identification number in the refueling request information by using received refueling authorization information, and sending refueling permission information if the validation is passed; otherwise, sending alarm information; and a refueling completion unit, for refueling the vehicle based on the refueling account information and the refueling amount information after receiving a refueling confirmation message, and sending refueling completion information.

According to a seventh aspect, the present application provides a system for automatic refueling of a driverless vehicle, comprising: the apparatus for automatic refueling of a driverless vehicle according to the above-mentioned fourth aspect, the apparatus for automatic refueling of a driverless vehicle according to the above-mentioned fifth aspect, and the apparatus for automatic refueling of a driverless vehicle according to the above-mentioned sixth aspect.

According to the method, apparatus, and system for automatic refueling of a driverless vehicle provided by the present application, it needs to be determined whether the vehicle satisfies a refueling condition first. When the refueling condition is satisfied, the refueling request message is sent, and gas station information can be acquired in time. Then, the destination gas station and driving route to the destination gas station are determined from the acquired preselected gas station information, thereby avoiding the waste of time and mileage in finding the gas station. Afterward, the vehicle arrives at the destination gas station based on the driving route, sends refueling request information, and is refueled after confirmation, thereby improving the refueling efficiency.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
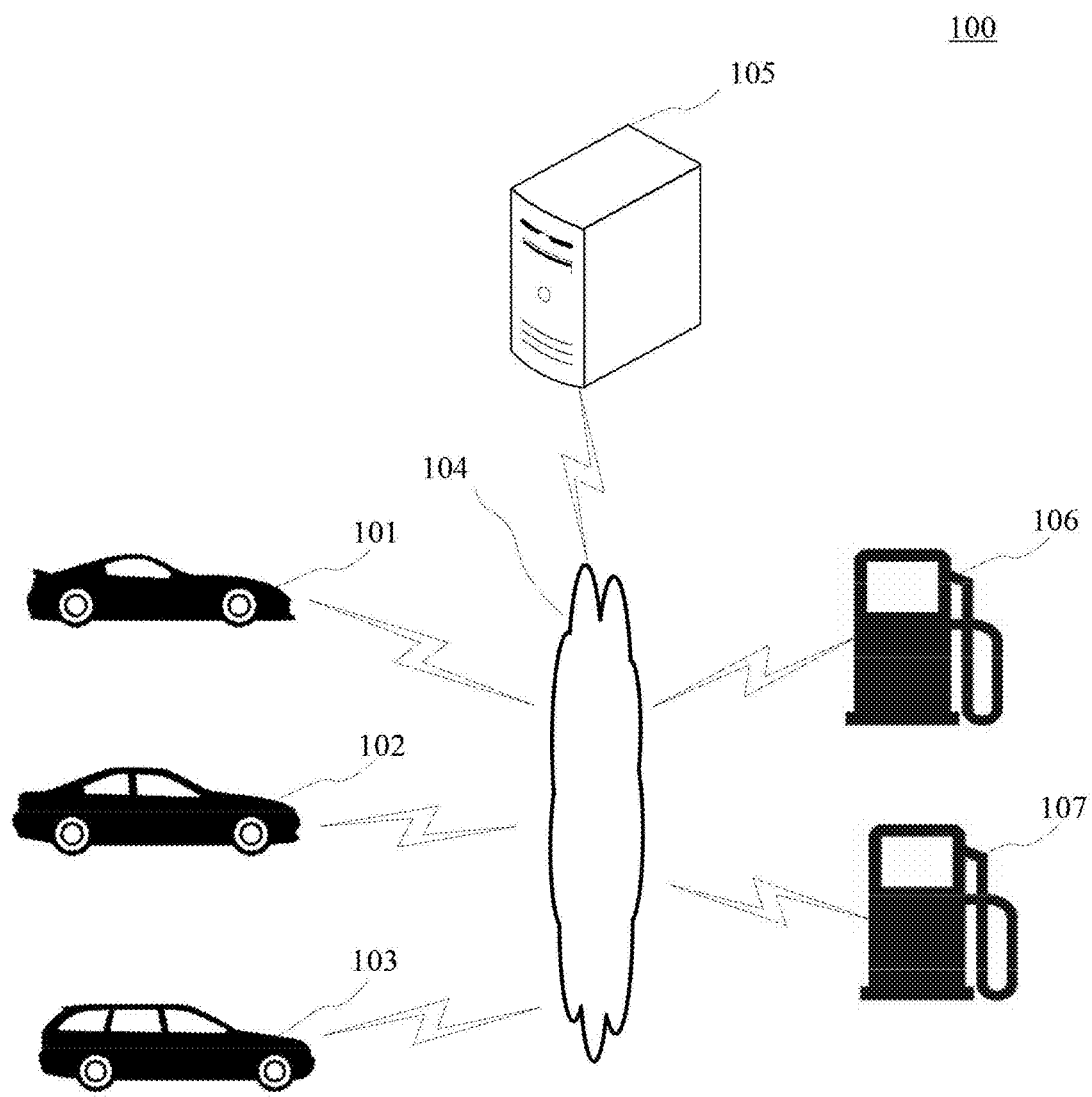
FIG. 1 is an architectural diagram of a system in which the present application may be implemented.

FIG. 1 shows a system architecture 100 in which a method for automatic refueling of a driverless vehicle and an apparatus for automatic refueling of a driverless vehicle according to embodiments of the present application may be implemented.

As shown in FIG. 1, the system architecture 100 may include driverless vehicles 101, 102, and 103, a network 104, a server 105, and refueling terminals 106 and 107. The network 104 is a medium for providing communication links between the driverless vehicles 101, 102, and 103 and the server 105, and between the server 105 and the refueling terminals 106 and 107. The network 104 may include various connection types, such as wired and wireless communication links or optical fiber cables.

The driverless vehicles 101, 102, and 103 interact with the server 105 through the network 104, to send a refueling request message to the server 105, and receive preselected gas station information from the server 105. The server 105 sends a refueling authorization information to the refueling terminals 106 and 107, to enable the driverless vehicles 101, 102, and 103 to perform information communication with the refueling terminals 106 and 107 during refueling.

The driverless vehicles 101, 102, and 103 include various vehicles having an information operating device and supporting transmission and reception of information. The server 105 may be a server providing various refueling information, for example, a refueling server providing refueling information to the driverless vehicles 101, 102, and 103. The refueling terminals 106 and 107 may communicate with the server 105, and may refuel the driverless vehicles 101, 102, and 103.

It should be noted that the method for automatic refueling of a driverless vehicle that is provided in the embodiment of the present application may be initiated by the driverless vehicles 101, 102, and 103: the driverless vehicles 101, 102, and 103 initiate refueling requests to the server 105; the server 105 performs a corresponding operation, returns preselected gas station information to the driverless vehicles 101, 102, and 103, and sends refueling authorization messages to the refueling terminals 106 and 107; the driverless vehicles 101, 102, and 103 communicate with the refueling terminals 106 and 107, to complete automatic refueling.

It should be appreciated that the number of driverless vehicles, the number of networks, the number of servers, and the number of refueling terminals in FIG. 1 are merely illustrative. Any number of terminal devices, networks, and servers may be provided based on the implementation requirements.

Figure 2:
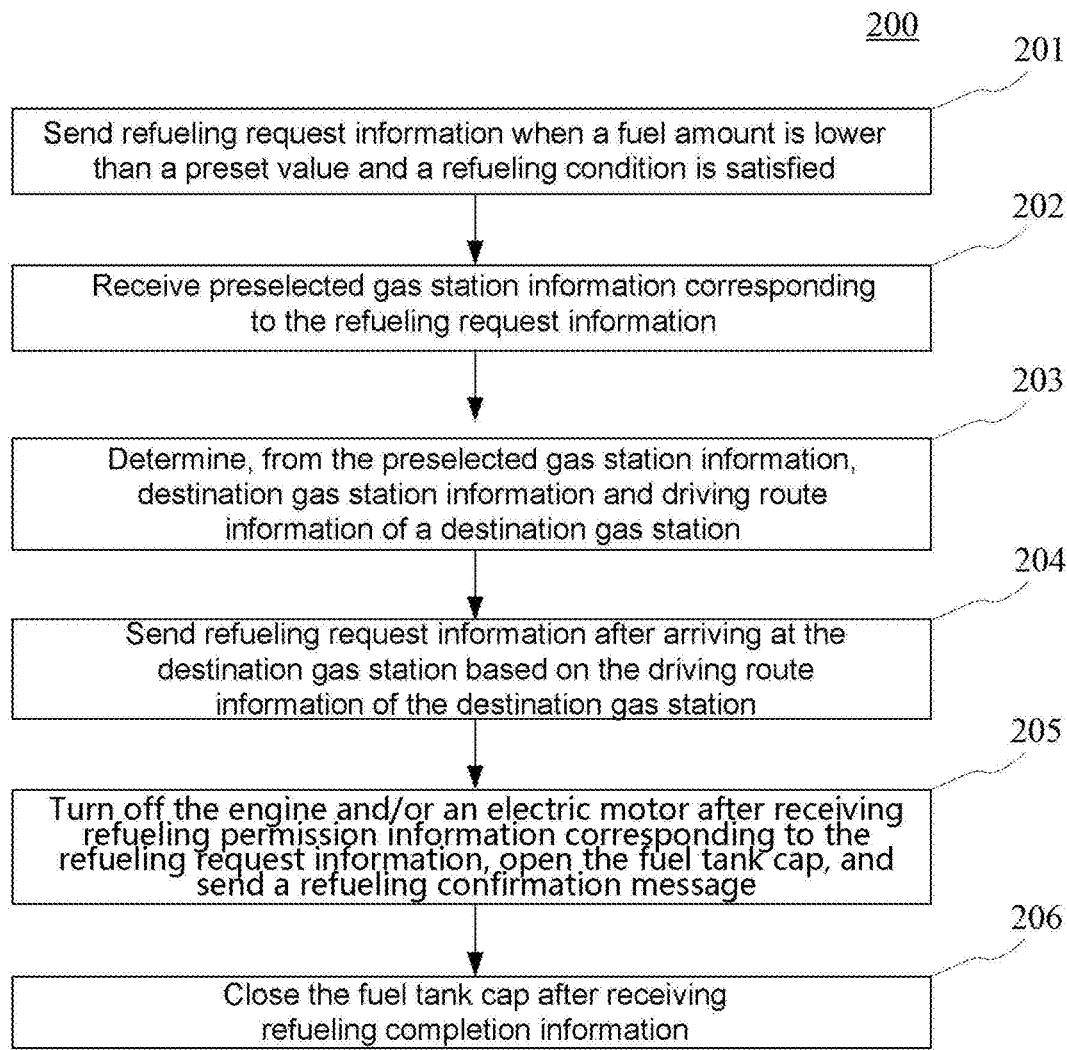
FIG. 2 is a flow chart of a method for automatic refueling of a driverless vehicle according to an embodiment of the present application.

Further referring to FIG. 2, a flow 200 of a method for automatic refueling of a driverless vehicle according to an embodiment is shown. The method for automatic refueling of a driverless vehicle includes the following steps:

Step 201: Send refueling request information when a fuel amount is lower than a preset value and a refueling condition is satisfied.

The refueling condition includes at least one of following conditions: the vehicle is in a driverless state; and an instruction permitting automatic refueling is received. The refueling request information includes a vehicle identification number, vehicle location information, and information about drivable mileage using remaining fuel in the vehicle.

In this embodiment, the method of automatic refueling of the driverless vehicle operates on a vehicle, e.g., the driverless vehicle as shown in FIG. 1. The preset value of the fuel amount of the vehicle may be set to, e.g., 20%, 10% or other percentages of the total fuel amount according to actual conditions. The refueling condition refers to a condition that needs to be satisfied in order to refuel the vehicle when the fuel amount is lower than the preset value. For example, either when the driverless vehicle is in the driverless state or when there is a person in the driverless vehicle but the driverless vehicle receives the instruction permitting automatic refueling, the driverless vehicle may send refueling request information to a refueling server, the refueling request information including a vehicle identification number, vehicle location information, and information about drivable mileage using remaining fuel in the vehicle. The vehicle identification number is used for validating the driverless vehicle before refueling. The vehicle location information and the information about the drivable mileage using the remaining fuel in the vehicle are used for determining available gas stations.

In some optional implementations of this embodiment, the method of this embodiment may further include: sending fuel amount prompt information when the fuel amount is detected to be lower than the preset value, the fuel amount prompt information including voice prompt information, image prompt information, and information about a remaining available mileage corresponding to the current fuel amount.

As can be known from the foregoing descriptions, in order to implement automatic refueling by using the method of this embodiment, not only the fuel amount needs to be lower than the preset value, but also the refueling condition needs to be satisfied. The refueling condition includes at least one of the following conditions: the vehicle is in the driverless state; and the instruction permitting automatic refueling is received. That is, automatic refueling may be performed based on information about the state of the driverless vehicle or after the instruction permitting automatic refueling is received. Therefore, when the fuel amount is lower than the preset value, prompt information, image prompt information, and information about the remaining available mileage corresponding to the current fuel amount need to be sent to facilitate the user performing a corresponding operation.

Step 202: Receive preselected gas station information corresponding to the refueling request information.

The refueling request information is received by the refueling server. The refueling server selects preselected gas station information for the driverless vehicle based on the refueling request information. The preselected gas station information includes location information of the preselected gas station, name information of the preselected gas station, driving route information of the preselected gas station, and refuel-queuing information of the preselected gas station corresponding to a refuel-queuing condition. The refuel-queuing condition includes at least one of waiting time for refueling, a distance to the gas station, and time required to reach the gas station. The refuel-queuing information includes at least one of: the number of idle automatic refueling terminals; and the number of vehicles waiting for refueling.

Step 203: Determine, from the preselected gas station information, destination gas station information and driving route information of a destination gas station.

After the preselected gas station information is obtained, a destination gas station may be selected according to a criterion. For example, the gas station with the shortest waiting time for refueling is selected as the destination gas station, the gas station with the shortest distance to the gas station is selected as the destination gas station, or the gas station with the shortest time required to reach the gas station is selected as the destination gas station.

Step 204: Send refueling request information after arriving at the destination gas station based on the driving route information of the destination gas station.

After determining the destination gas station, the driverless vehicle may go to the destination gas station based on the driving route information of the destination gas station, and send a refueling request to an available automatic refueling terminal at the destination gas station. The automatic refueling terminal is used for implementing automatic refueling of the vehicle. The refueling request information includes the vehicle identification number, refueling account information, and refueling amount information.

Step 205: Turn off the engine and/or an electric motor after receiving refueling permission information corresponding to the refueling request information, open the fuel tank cap, and send a refueling confirmation message.

After receiving the refueling request information, the automatic refueling terminal validates the refueling request information, and sends a refueling permission information to the driverless vehicle when the validation is passed. After receiving the refueling permission information, the driverless vehicle moves to a refueling position corresponding to the automatic refueling terminal, turns off the engine and/or the electric motor, opens the fuel tank cap, and sends a refueling confirmation message, to notify the automatic refueling terminal that the driverless vehicle is ready and waiting for refueling.

Step 206: Close the fuel tank cap after receiving refueling completion information.

After refueling the driverless vehicle according to the refueling amount information, the automatic refueling terminal sends the refueling completion information. After receiving the refueling completion information, the driverless vehicle closes the fuel tank cap. Thus, the automatic refueling process is complete.

In some optional implementations of this embodiment, after finishing automatic refueling, the driverless vehicle does not usually stay at the gas station, but returns to the starting point of the refueling process or other locations. Therefore, the method of this embodiment further includes: returning to a specified location.

Figure 3:
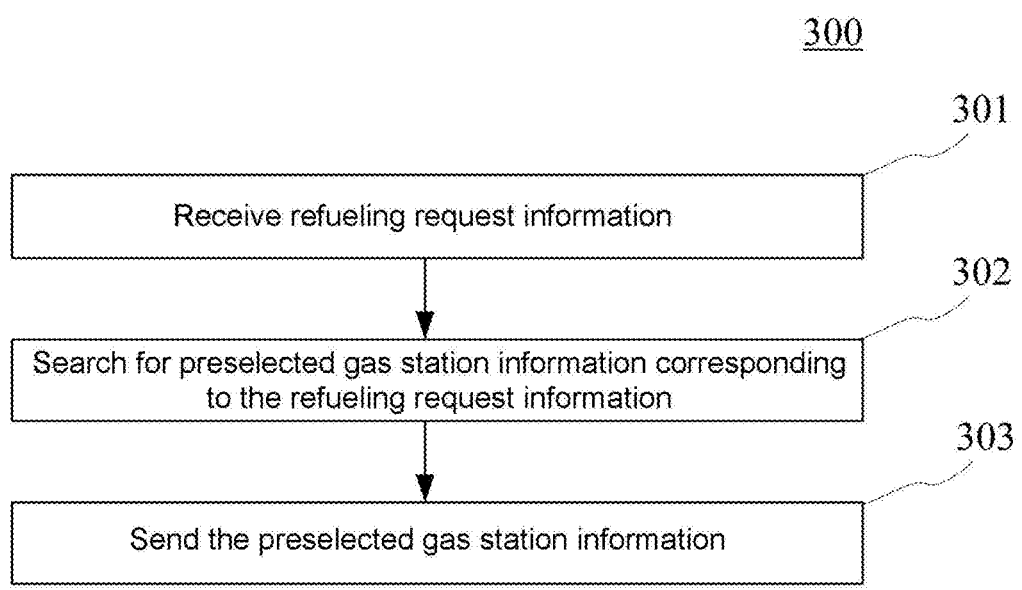
FIG. 3 is a flow chart of a method for automatic refueling of a driverless vehicle according to another embodiment of the present application.

Further referring to FIG. 3, a flow 300 of a method of automatic refueling of a driverless vehicle according to another embodiment is shown. The method of automatic refueling of the driverless vehicle includes the following steps:

Step 301: Receive refueling request information.

A driverless vehicle sends a refueling request information when a fuel amount is lower than a preset value and a refueling condition is satisfied. The refueling request information includes a vehicle identification number, vehicle location information, and information about drivable mileage using remaining fuel in the vehicle.

Step 302: Search for preselected gas station information corresponding to the refueling request information.

After receiving the refueling request information, the refueling server searches for preselected gas station information corresponding to the refueling request information. The refueling server is connected to the gas stations through a network, and may obtain information such as the locations, refuel-queuing statuses, and waiting times for refueling of the gas stations.

In some optional implementations of this embodiment, searching for preselected gas station information corresponding to the refueling request information may include the following steps:

First step: Search for information about gas stations within a specified range corresponding to the vehicle location information.

The gas stations are distributed at multiple locations. The refueling server first acquires information about gas stations of which the distance to the location of the vehicle fall within a given range. The gas station information may include location information, refuel-queuing information, and the name of the gas station.

Second step: Determine the preselected gas station information from the information about gas stations based on the information about the drivable mileage using the remaining fuel in the vehicle and the refuel-queuing information.

The refueling server may determine the longest distance that the driverless vehicle can travel based on the information about the drivable mileage using the remaining fuel in the vehicle, and select, based on the gas station information, some gas stations that the driverless vehicle can reach; and then determine the preselected gas station information based on the refuel-queuing information of these reachable gas stations.

The refuel-queuing information includes at least one of: the number of idle automatic refueling terminals at the gas station and the number of vehicles waiting for refueling.

In some optional implementations of this embodiment, determining the preselected gas station information from the gas station information based on the information about the drivable mileage using the remaining fuel in the vehicle and refuel-queuing information may include the following steps:

First step: Select preliminarily selected gas station information from the information about the gas stations based on the information about the drivable mileage using the remaining fuel in the vehicle.

The preliminarily selected gas station information is information about gas stations that the driverless vehicle can reach based on the drivable mileage using the remaining fuel in the vehicle. It should be noted that the drivable mileage using the remaining fuel, which is taken into consideration for determining preliminarily selected gas stations, is not an ideal straight-line distance, but needs to be determined according to actual routes.

Second step: Acquire refuel-queuing information corresponding to the preliminarily selected gas station information, and use a first specified number of preliminarily selected gas stations satisfying a refuel-queuing condition as preselected gas stations.

The refuel-queuing condition includes at least one of waiting time for refueling, a distance to the gas station, and time required to reach the gas station.

Third step: Determine driving route information of the preselected gas stations based on the vehicle location information and location information of the preselected gas stations.

The refueling server may learn the specific location of the driverless vehicle based on the vehicle location information. After obtaining the locations of the preselected gas stations, the refueling server may determine driving routes from the driverless vehicle to the preselected gas stations according to actual routes.

Fourth step: Encapsulate the location information of the preselected gas stations, the name information of the preselected gas stations, the driving route information of the preselected gas stations, and the refuel-queuing information of the preselected gas stations corresponding to the refuel-queuing condition into the preselected gas station information.

Step 303: Send the preselected gas station information.

After obtaining the preselected gas station information, the refueling server sends the preselected gas station information to the driverless vehicle.

In addition, the refueling server also needs to send a refueling authorization information to an automatic refueling terminal, so as to establish a connection between the driverless vehicle and the automatic refueling terminal. The refueling authorization information includes the vehicle identification number.

Figure 4:
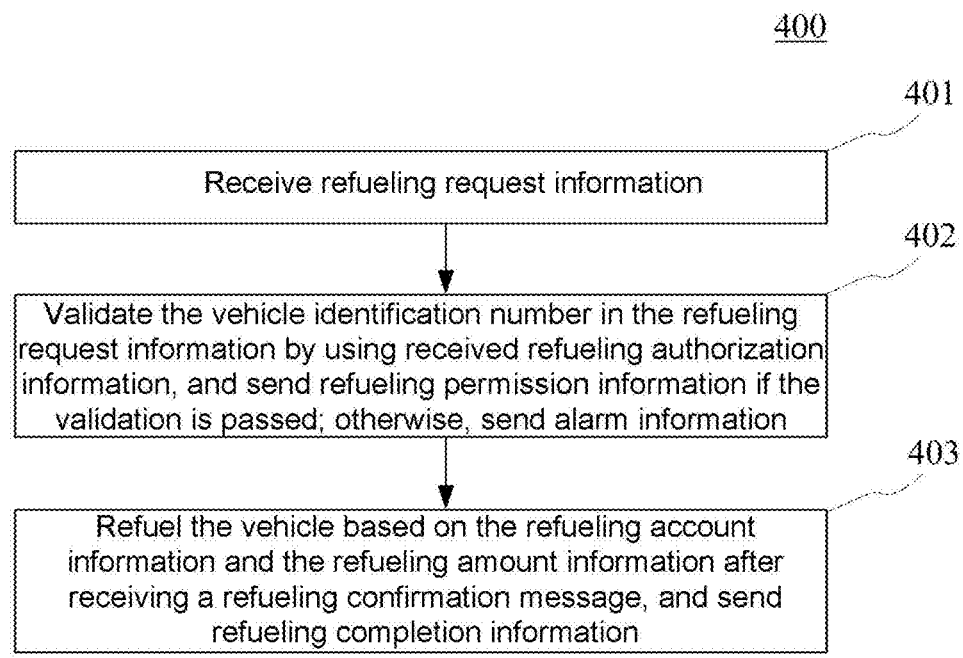
FIG. 4 is a flow chart of a method for automatic refueling of a driverless vehicle according to still another embodiment of the present application.

Further referring to FIG. 4, a flow 400 of a method for automatic refueling of a driverless vehicle according to an embodiment is shown. The method of automatic refueling of a driverless vehicle includes the following steps:

Step 401: Receive refueling request information.

An automatic refueling terminal receives the refueling request information sent by a driverless vehicle, the refueling request information including a vehicle identification number, refueling account information, and refueling amount information.

Step 402: Validate the vehicle identification number in the refueling request information by using received refueling authorization information, and send refueling permission information if the validation is passed; otherwise, send alarm information.

Before receiving the refueling request information sent by the driverless vehicle, the automatic refueling terminal receives a refueling authorization information sent by a refueling server. The automatic refueling terminal may validate the refueling request message based on the refueling authorization information to check whether the driverless vehicle has been confirmed by the refueling server, and return the validation result to the refueling server. The refueling server records the refueling request of the driverless vehicle. If the validation is passed, the automatic refueling terminal sends refueling permission information to the driverless vehicle, to instruct the driverless vehicle to get ready for refueling; otherwise, the automatic refueling terminal sends alarm information.

Step 403: Refuel the vehicle based on the refueling account information and the refueling amount information after receiving a refueling confirmation message, and send refueling completion information.

After receiving the refueling permission information, the driverless vehicle automatically moves to a refueling position corresponding to the automatic refueling terminal, opens the fuel tank cap, and sends refueling confirmation information. The automatic refueling terminal sends refueling completion information to the driverless vehicle after refueling the vehicle based on the refueling account information and the refueling amount information.

In some optional implementations of this embodiment, the refueling account information also needs to be validated.

Refueling the vehicle based on the refueling account information and the refueling amount information includes: checking whether the refueling account information is a valid account, and if yes, checking balance information of the refueling account and refueling the vehicle base on the balance information; otherwise, sending alarm information. The valid account herein may be an account that has been confirmed by the refueling server and satisfies a certain condition (e.g., there is no negative refueling record, the driverless vehicle is consistent with vehicle owner information, or other conditions).

In some optional implementations of this embodiment, the balance information of the refueling account also needs to be queried. Checking balance information of the refueling account and refueling the vehicle based on the balance information includes: checking whether the account balance is greater than or equal to an amount corresponding to the refueling amount information, and if yes, refueling the vehicle based on the refueling amount information, and deducting an amount corresponding to the refueling amount information from the account balance; otherwise, sending alert information indicating that the account needs to be recharged.

In the method of this embodiment, it needs to be determined whether the vehicle satisfies a refueling condition first. When the refueling condition is satisfied, the refueling request message is sent, and gas station information can be acquired in time. Then, the destination gas station and driving route to the destination gas station are determined from the acquired preselected gas station information, thereby avoiding the waste of time and mileage in finding the gas station. Afterward, the vehicle arrives at the destination gas station based on the driving route, sends refueling request information, and is refueled after confirmation, thereby improving the refueling efficiency.

Figure 5:
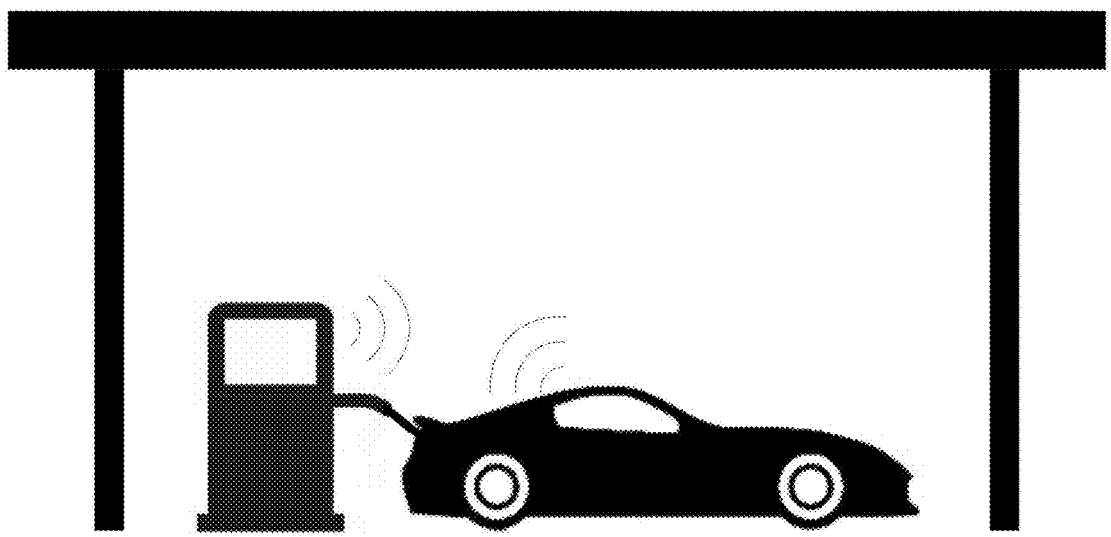
FIG. 5 is a schematic diagram of an application scenario of a method for automatic refueling of a driverless vehicle according to the present application.

Further referring to FIG. 5, a schematic diagram of an application scenario of a method for automatic refueling of a driverless vehicle according to the present application is shown. A driverless vehicle sends a refueling request to a refueling server, receives preselected gas station information sent by the refueling server, determines a destination gas station from the preselected gas station information, and then moves to the destination gas station according to a driving route to the destination gas station. An automatic refueling terminal at the destination gas station receives refueling authorization information from the refueling server, and waits for arrival of the driverless vehicle. After arriving at the destination gas station, the driverless vehicle sends request information to the automatic refueling terminal. The automatic refueling terminal validates the refueling request information based on the refueling authorization information, and sends refueling permission information to the driverless vehicle after the validation is passed. After receiving the refueling permission information, the driverless vehicle moves to a corresponding refueling position, opens the fuel tank cap, and sends a refueling confirmation message to the automatic refueling terminal. After receiving the refueling confirmation message, the automatic refueling terminal controls a fuel pipe to be aligned with the fuel tank for refueling, withdraws the fuel pipe after the refueling is completed, and sends refueling completion information to the driverless vehicle. After receiving the refueling completion information, the driverless vehicle closes the fuel tank cap, and leaves the refueling position.

Figure 6:
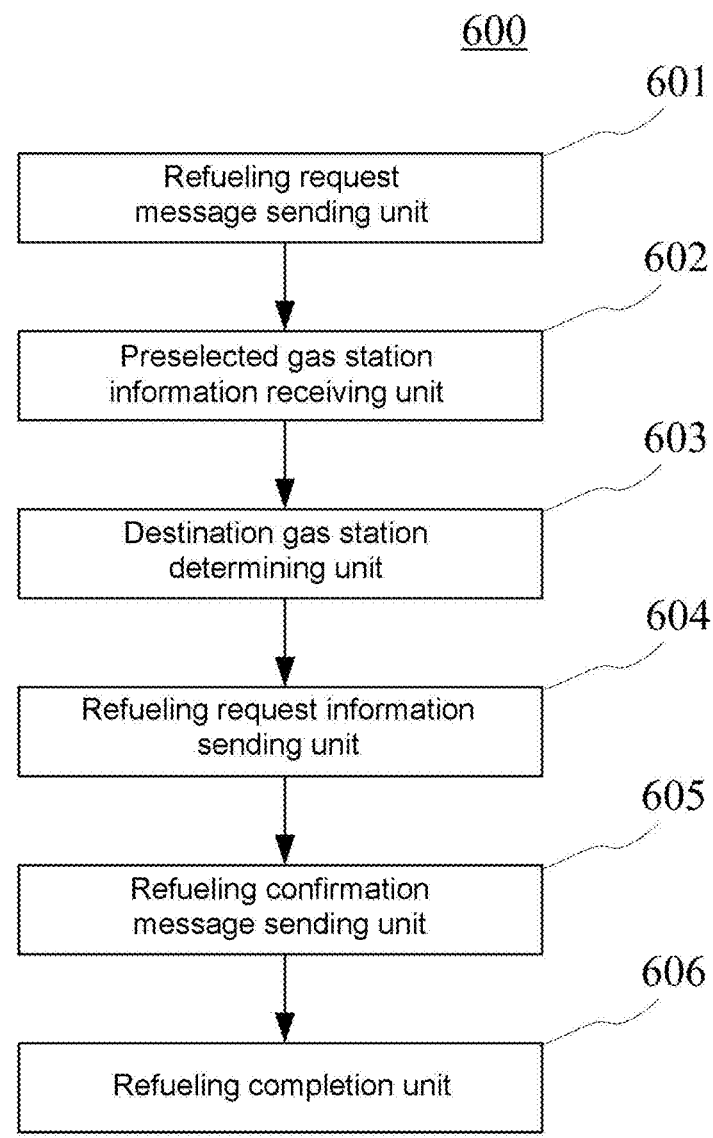
FIG. 6 is a schematic structural diagram of an embodiment of an apparatus for automatic refueling of a driverless vehicle according to the present application.

Further referring to FIG. 6, as an implementation of the methods shown in the above-mentioned figures, the present application provides an embodiment for an apparatus for automatic refueling of a driverless vehicle. This apparatus embodiment corresponds to the method embodiment as shown in FIG. 2.

As shown in FIG. 6, the apparatus 600 for automatic refueling of a driverless vehicle according to this embodiment includes: a refueling request information sending unit 601, a preselected gas station information receiving unit 602, a destination gas station determining unit 603, a refueling request information sending unit 604, a refueling confirmation message sending unit 605, and a refueling completion unit 606. The refueling request information sending unit 601 is used for sending refueling request information when a fuel amount is lower than a preset value and a refueling condition is satisfied, the refueling condition comprising at least one of: the vehicle is in a driverless state; and an instruction permitting automatic refueling is received, and the refueling request information comprising a vehicle identification number, vehicle location information, and information about drivable mileage using remaining fuel in the vehicle. The preselected gas station information receiving unit 602 is used for receiving preselected gas station information corresponding to the refueling request information, the preselected gas station information comprising location information of a preselected gas station, driving route information of the preselected gas station, and refuel-queuing information of the preselected gas station corresponding to a refuel-queuing condition, the refuel-queuing condition comprising at least one of waiting time for refueling, a distance to the gas station, and time required to reach the gas station, and the refuel-queuing information comprising at least one of a number of idle automatic refueling terminals and a number of vehicles waiting for refueling. The destination gas station determining unit 603 is used for determining, from the preselected gas station information, destination gas station information and driving route information of a destination gas station. The refueling request information sending unit 604 is used for sending refueling request information after arriving at the destination gas station based on the driving route information of the destination gas station, the refueling request information comprising the vehicle identification number, refueling account information, and refueling amount information. The refueling confirmation message sending unit 605 is used for turning off an engine and/or an electric motor after receiving refueling permission information corresponding to the refueling request information, opening a fuel tank cap, and sending refueling confirmation information. The refueling completion unit 606 is used for closing the fuel tank cap after receiving refueling completion information.

In some optional implementations of this embodiment, the apparatus 600 for automatic refueling of the driverless vehicle further includes: a refueling prompting unit (not shown in the figure), for sending fuel amount prompt information when the fuel amount is detected to be lower than the preset value, the fuel amount prompt information comprising voice prompt information, image prompt information, and information about a remaining available mileage corresponding to the current fuel amount.

In some optional implementations of this embodiment, the apparatus 600 for automatic refueling of the driverless vehicle further includes: a returning unit (not shown in the figure), for returning to a specified location after receiving the refueling completion information.

Figure 7:
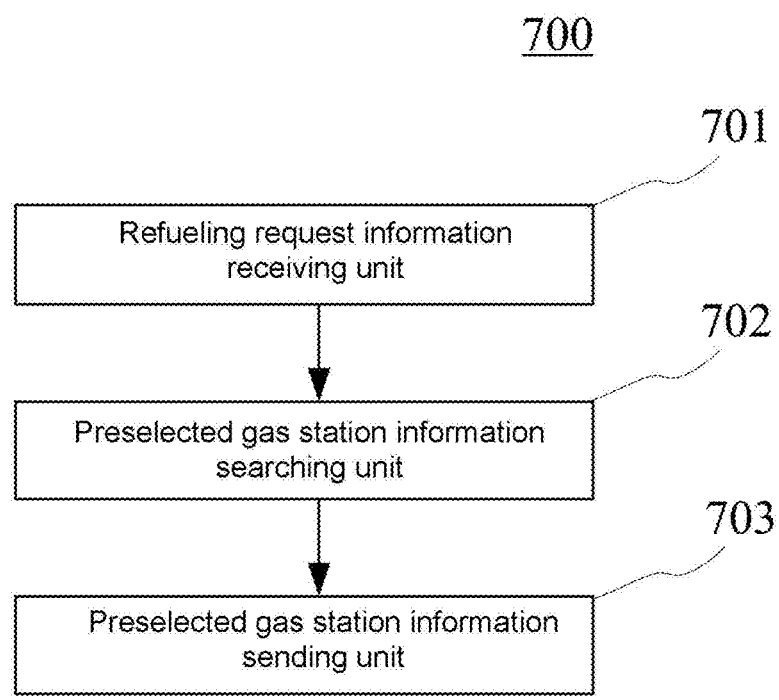
FIG. 7 is a schematic structural diagram of an apparatus for automatic refueling of a driverless vehicle according to another embodiment of the present application.

Further referring to FIG. 7, as an implementation of the methods shown in the above-mentioned figures, the present application provides an embodiment for an apparatus for automatic refueling of a driverless vehicle. This apparatus embodiment corresponds to the method embodiment as shown in FIG. 3.

As shown in FIG. 7, the apparatus 700 for automatic refueling of a driverless vehicle according to this embodiment includes: a refueling request information receiving unit 701, a preselected gas station information searching unit 702, and a preselected gas station information sending unit 703. The refueling request information receiving unit 701 is used for receiving refueling request information, the refueling request information comprising a vehicle identification number, vehicle location information, and information about drivable mileage using remaining fuel in the vehicle. The preselected gas station information searching unit 702 is used for searching for preselected gas station information corresponding to the refueling request information. The preselected gas station information sending unit 703 is used for sending the preselected gas station information.

In some optional implementations of this embodiment, the preselected gas station information searching unit 702 includes a gas station information searching subunit (not shown in the figure) and a preselected gas station information determining subunit (not shown in the figure). The gas station information searching subunit is used for searching for information about a gas station within a specified range corresponding to the vehicle location information. The preselected gas station information determining subunit is used for determining the preselected gas station information from the information about the gas station based on the information about the drivable mileage using the remaining fuel in the vehicle and refuel-queuing information, the refuel-queuing information comprising at least one of: a number of idle automatic refueling terminals at a gas station and a number of vehicles waiting for refueling.

In some optional implementations of this embodiment, the preselected gas station information determining subunit includes: a preliminarily selected gas station information selecting module (not shown in the figure), a preselected gas station determining module (not shown in the figure), a preselected gas station driving route information determining module (not shown in the figure), and a preselected gas station information encapsulating module (not shown in the figure). The preliminarily selected gas station information selecting module is used for selecting preliminarily selected gas station information from the information about the gas station based on the information about the drivable mileage using the remaining fuel in the vehicle. The preselected gas station determining module is used for acquiring refuel-queuing information corresponding to the preliminarily selected gas station information, and using a first specified number of preliminarily selected gas stations satisfying a refuel-queuing condition as a preselected gas station, the refuel-queuing condition comprising at least one of waiting time for refueling, a distance to the gas station, and time required to reach the gas station. The preselected gas station driving route information determining module is used for determining driving route information of the preselected gas station based on the vehicle location information and location information of the preselected gas station. The preselected gas station information encapsulating module is used for encapsulating the location information of the preselected gas station, name information of the preselected gas station, the driving route information of the preselected gas station, and the refuel-queuing information of the preselected gas station corresponding to the refuel-queuing condition into the preselected gas station information.

In some optional implementations of this embodiment, the apparatus 700 for automatic refueling of the driverless vehicle further includes: a refueling authorization information sending unit (not shown in the figure), for sending refueling authorization information, the refueling authorization information comprising the vehicle identification number.

Figure 8:
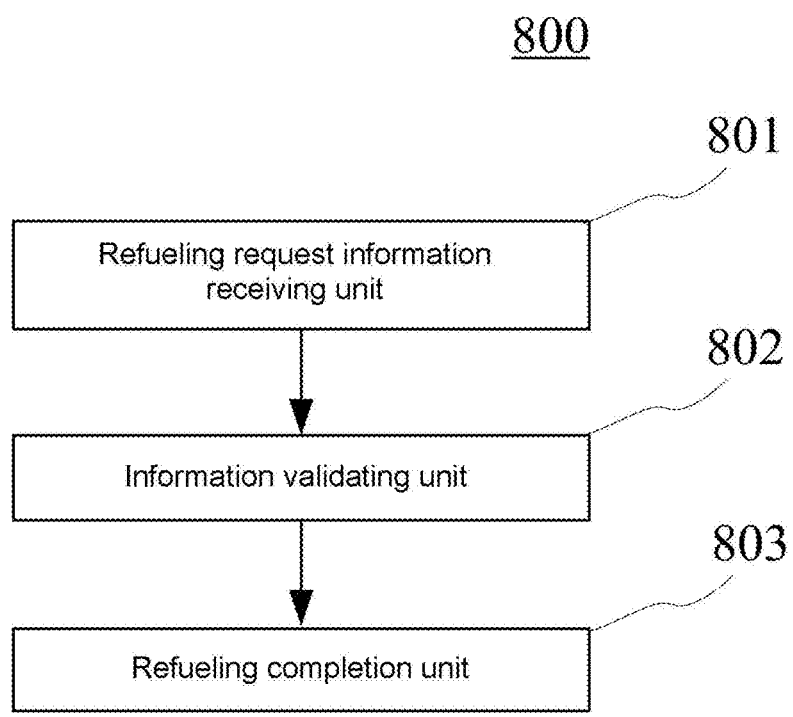
FIG. 8 is a schematic structural diagram of an apparatus for automatic refueling of a driverless vehicle according to still another embodiment of the present application.

Further referring to FIG. 8, as an implementation of the methods shown in the above-mentioned figures, the present application provides an embodiment for an apparatus for automatic refueling of a driverless vehicle. This apparatus embodiment corresponds to the method embodiment shown in FIG. 4.

As shown in FIG. 8, the apparatus 800 for automatic refueling of a driverless vehicle according to this embodiment includes:

a refueling request information receiving unit 801, an information validating unit 802, and a refueling completion unit 803. The refueling request information receiving unit 801 is used for receiving refueling request information, the refueling request information comprising a vehicle identification number, refueling account information, and refueling amount information. The information validating unit 802 is used for validating the vehicle identification number in the refueling request information by using received refueling authorization information, and sending refueling permission information if the validation is passed; otherwise, sending alarm information. The refueling completion unit 803 is used for refueling the vehicle based on the refueling account information and the refueling amount information after receiving a refueling confirmation message, and sending refueling completion information.

In some optional implementations of this embodiment, the refueling completion unit 803 includes: an account checking subunit (not shown in the figure), for checking whether the refueling account information is a valid account, and if yes, checking balance information of the refueling account and refueling the vehicle based on the balance information; otherwise, sending alarm information.

In some optional implementations of this embodiment, the account authentication subunit includes: an account balance checking module (not shown in the figure), for checking whether an account balance is greater than or equal to an amount corresponding to the refueling amount information, and if yes, refueling the vehicle based on the refueling amount information, and deducting the amount corresponding to the refueling amount information from the account balance; otherwise, sending alert information indicating that the account needs to be recharged.

An embodiment of the present application also provides a system for automatic refueling of a driverless vehicle, including the apparatus for automatic refueling of a driverless vehicle corresponding to FIG. 6, the apparatus for automatic refueling of a driverless vehicle corresponding to FIG. 7, and the apparatus for automatic refueling of a driverless vehicle corresponding to FIG. 8.

Figure 9:
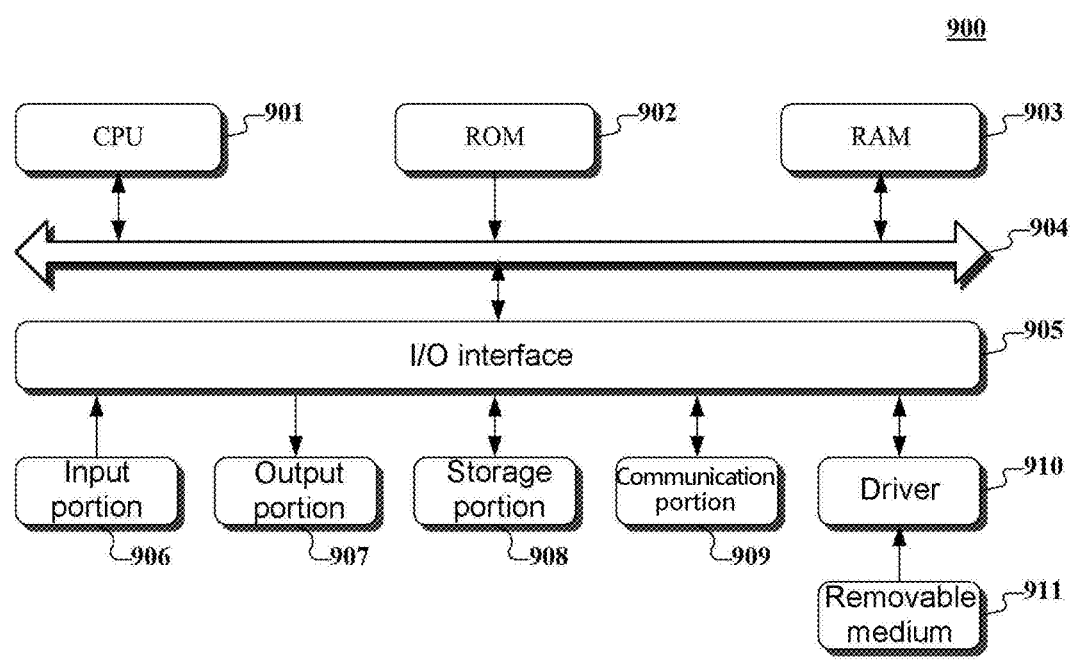
FIG. 9 is a schematic structural diagram of a server according to an embodiment of the present application.

Referring to FIG. 9, a schematic structural diagram of a computer system 900 adapted to implement a server of the embodiments of the present application is shown.

As shown in FIG. 9, the computer system 900 includes a central processing unit (CPU) 901, which may execute various appropriate actions and processes in accordance with a program stored in a read-only memory (ROM) 902 or a program loaded into a random access memory (RAM) 903 from a storage portion 908.

The RAM 903 also stores various programs and data required by operations of the system 900. The CPU 901, the ROM 902 and the RAM 903 are connected to each other through a bus 904. An input/output (I/O) interface 905 is also connected to the bus 904.

The following components are connected to the I/O interface 905: an input portion 906 including a keyboard, a mouse, etc.; an output portion 907 comprising a cathode ray tube (CRT), a liquid crystal display device (LCD), a speaker, etc.; a storage portion 908 including a hard disk and the like; and a communication portion 909 comprising a network interface card, such as a LAN card and a modem. The communication portion 909 performs communication processes via a network, such as the Internet. A driver 910 is also connected to the I/O interface 905 as required. A removable medium 911, such as a magnetic disk, an optical disk, a magneto-optical disk, and a semiconductor memory, may be installed on the driver 910, to facilitate the retrieval of a computer program from the removable medium 911, and the installation thereof on the storage portion 908 as needed.

In particular, according to an embodiment of the present disclosure, the process described above with reference to the flowcharts may be implemented in a computer software program.

For example, an embodiment of the present disclosure includes a computer program product, which comprises a computer program that is tangibly embedded in a machine-readable medium. The computer program comprises program codes for executing the method of the flowcharts. In such an embodiment, the computer program may be downloaded and installed from a network via the communication portion 909, and/or may be installed from the removable media 911.

The flowcharts and block diagrams in the figures illustrate architectures, functions and operations that may be implemented according to the system, the method and the computer program product of the various embodiments of the present disclosure. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units involved in the embodiments of the present application may be implemented by way of software or hardware. The described units may also be provided in a processor, for example, described as: a processor, comprising a refueling request information sending unit, a preselected gas station information receiving unit, a destination gas station determining unit, a refueling confirmation message sending unit and a refueling completion unit, where the names of these units are not considered as a limitation to the units. For example, the refueling request information sending unit may also be described as "a unit for sending refueling request information".

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. The one or more programs, when executed by a device, cause the device to: send refueling request information when a fuel amount is lower than a preset value and a refueling condition is satisfied, the refueling condition comprising at least one of: the vehicle is in a driverless state, and an instruction permitting automatic refueling is received; and the refueling request information comprising a vehicle identification number, vehicle location information, and information about drivable mileage using remaining fuel in the vehicle; receive preselected gas station information corresponding to the refueling request information, the preselected gas station information comprising location information of a preselected gas station, driving route information of the preselected gas station, and refuel-queuing information of the preselected gas station corresponding to a refuel-queuing condition, the refuel-queuing condition comprising at least one of waiting time for refueling, a distance to the gas station, and time required to reach the gas station, and the refuel-queuing information comprising at least one of a number of idle automatic refueling terminals and a number of vehicles waiting for refueling; determine, from the preselected gas station information, destination gas station information and driving route information of a destination gas station; send refueling request information after arriving at the destination gas station based on the driving route information of the destination gas station, the refueling request information comprising the vehicle identification number, refueling account information, and refueling amount information; turn off an engine and/or an electric motor after receiving refueling permission information corresponding to the refueling request information, opening a fuel tank cap, and sending refueling confirmation information; and close the fuel tank cap after receiving refueling completion information.

The foregoing is only a description of the embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the disclosure, such as, technical solutions formed by replacing the features as disclosed in the present application with (but not limited to), technical features with similar functions.

What is claimed is:

1. A method for automatic refueling of a driverless vehicle, comprising:
   sending to a server refueling request information when a fuel amount is lower than a preset value and a refueling condition is satisfied, the refueling condition comprising at least one of: the vehicle is in a driverless state, and an instruction permitting automatic refueling is received; and the refueling request information comprising a vehicle identification number, vehicle location information, and information about drivable mileage using remaining fuel in the vehicle;
   receiving preselected gas station information corresponding to the refueling request information, the preselected gas station information comprising location information of a preselected gas station, driving route information of the preselected gas station, and refuel-queuing information of the preselected gas station corresponding to a refuel-queuing condition, the refuel-queuing condition comprising at least one of waiting time for refueling, a distance to the gas station, and time required to reach the gas station, and the refuel-queuing information comprising at least one of a number of idle automatic refueling terminals and a number of vehicles waiting for refueling;
   determining, from the preselected gas station information, destination gas station information and driving route information of a destination gas station;
   sending to a refueling terminal refueling request information after arriving at the destination gas station based on the driving route information of the destination gas station, the refueling request information comprising the vehicle identification number, refueling account information, and refueling amount information;
   turning off an engine and/or an electric motor after receiving refueling permission information corresponding to the refueling request information, opening a fuel tank cap, and sending refueling confirmation information; and
   closing the fuel tank cap after receiving refueling completion information.

2. The method according to claim 1, further comprising:
   sending fuel amount prompt information when the fuel amount is detected to be lower than the preset value, the fuel amount prompt information comprising voice prompt information, image prompt information, and information about a remaining available mileage corresponding to the current fuel amount.

3. The method according to claim 1, wherein the method further comprises, after the step of closing the fuel tank cap after receiving a refueling completion information:
   returning to a specified location.

4. A method for automatic refueling of a driverless vehicle, applied to a server, comprising:
   receiving refueling request information from a driverless vehicle, the refueling request information comprising a vehicle identification number, vehicle location information, and information about drivable mileage using remaining fuel in the vehicle;
   searching for preselected gas station information corresponding to the refueling request information; and
   sending the preselected gas station information to the driverless vehicle, for the driverless vehicle to determine destination gas station information and driving route information of a destination gas station for refueling.

5. The method according to claim 4, wherein the searching for the preselected gas station information corresponding to the refueling request information comprises:
   searching for information about a gas station within a specified range corresponding to the vehicle location information; and
   determining the preselected gas station information from the information about the gas station based on the information about the drivable mileage using the remaining fuel in the vehicle and refuel-queuing information, the refuel-queuing information comprising at least one of: a number of idle automatic refueling terminals at a gas station and a number of vehicles waiting for refueling.

6. The method according to claim 5, wherein the determining, based on the information about the drivable mileage using the remaining fuel in the vehicle and the refuel-queuing information, the preselected gas station information from the information about the gas station comprises:
   selecting preliminarily selected gas station information from the information about the gas station based on the information about the drivable mileage using the remaining fuel in the vehicle;
   acquiring refuel-queuing information corresponding to the preliminarily selected gas station information, and using a first specified number of preliminarily selected gas stations satisfying a refuel-queuing condition as a preselected gas station, the refuel-queuing condition comprising at least one of waiting time for refueling, a distance to the gas station, and time required to reach the gas station;
   determining driving route information of the preselected gas station based on the vehicle location information and location information of the preselected gas station; and
   encapsulating the location information of the preselected gas station, the driving route information of the preselected gas station, and the refuel-queuing information of the preselected gas station corresponding to the refuel-queuing condition into the preselected gas station information.

7. The method according to claim 4, further comprising:
   sending refueling authorization information, the refueling authorization information comprising the vehicle identification number.

8. A method for automatic refueling of a driverless vehicle, comprising:
   receiving refueling request information, the refueling request information comprising a vehicle identification number, refueling account information, and refueling amount information;
   validating the vehicle identification number in the refueling request information by using a received refueling authorization information, and sending refueling permission information if the validation is passed; otherwise, sending alarm information; and refueling the vehicle based on the refueling account information and the refueling amount information after receiving a refueling confirmation message, and sending refueling completion information, wherein the refueling the vehicle based on the refueling account information and the refueling amount information comprises:

checking whether the refueling account information comprises a valid account, in response to determining that the refueling account information comprises the valid account, checking balance information of the refueling account and refueling the vehicle based on the balance information; and in response to determining that the refueling account information does not comprise the valid account, sending alarm information.

9. The method according to claim 8, wherein the checking balance information of the refueling account and refueling the vehicle based on the balance information comprises:

checking whether an account balance is greater than or equal to an amount corresponding to the refueling amount information;

in response to determining that the account balance is greater than or equal to the amount corresponding to the refueling amount information, refueling the vehicle based on the refueling amount information, and deducting an amount corresponding to the refueling amount information from the account balance; and in response to determining that the account balance is not greater than or equal to the amount corresponding to the refueling amount information, sending alert information indicating that the account needs to be recharged.

10. An apparatus for automatic refueling of a driverless vehicle, comprising:

at least one processor; and a memory storing instructions, the instructions when executed by the at least one processor, cause the at least one processor to perform operations, the operations comprising:

sending to a server refueling request information when a fuel amount is lower than a preset value and a refueling condition is satisfied, the refueling condition comprising at least one of: the vehicle is in a driverless state; and an instruction permitting automatic refueling is received, and the refueling request information comprising a vehicle identification number, vehicle location information, and information about drivable mileage using remaining fuel in the vehicle;

receiving preselected gas station information corresponding to the refueling request information, the preselected gas station information comprising location information of a preselected gas station, driving route information of the preselected gas station, and refuel-queuing information of the preselected gas station corresponding to a refuel-queuing condition, the refuel-queuing condition comprising at least one of waiting time for refueling, a distance to the gas station, and time required to reach the gas station, and the refuel-queuing information comprising at least one of a number of idle automatic refueling terminals and a number of vehicles waiting for refueling;

determining, from the preselected gas station information, destination gas station information and driving route information of a destination gas station;

sending to a refueling terminal refueling request information after arriving at the destination gas station based on the driving route information of the destination gas station, the refueling request information comprising the vehicle identification number, refueling account information, and refueling amount information;

turning off an engine and/or an electric motor after receiving refueling permission information corresponding to the refueling request information, opening a fuel tank cap, and sending refueling confirmation information; and closing the fuel tank cap after receiving refueling completion information.

11. The apparatus according to claim 10, wherein the operations further comprise:

sending fuel amount prompt information when the fuel amount is detected to be lower than the preset value, the fuel amount prompt information comprising voice prompt information, image prompt information, and information about a remaining available mileage corresponding to the current fuel amount.

12. The apparatus according to claim 10, wherein the operations further comprise:

returning to a specified location after receiving the refueling completion information.

13. An apparatus for automatic refueling of a driverless vehicle, comprising:

at least one processor; and a memory storing instructions, the instructions when executed by the at least one processor, cause the at least one processor to perform operations, the operations comprising:

receiving refueling request information from a driverless vehicle, the refueling request information comprising a vehicle identification number, vehicle location information, and information about drivable mileage using remaining fuel in the vehicle;

searching for preselected gas station information corresponding to the refueling request information; and sending the preselected gas station information to the driverless vehicle, for the driverless vehicle to determine destination gas station information and driving route information of a destination gas station from the preselected gas station information.

14. The apparatus according to claim 13, wherein the searching for the preselected gas station information corresponding to the refueling request information comprises:

searching for information about a gas station within a specified range corresponding to the vehicle location information; and determining the preselected gas station information from the information about the gas station based on the information about the drivable mileage using the remaining fuel in the vehicle and refuel-queuing information, the refuel-queuing information comprising at least one of: a number of idle automatic refueling terminals at a gas station and a number of vehicles waiting for refueling.

15. The apparatus according to claim 14, wherein the determining, based on the information about the drivable mileage using the remaining fuel in the vehicle and the refuel-queuing information, the preselected gas station information from the information about the gas station comprises:

selecting preliminarily selected gas station information from the information about the gas station based on the information about the drivable mileage using the remaining fuel in the vehicle;

acquiring refuel-queuing information corresponding to the preliminarily selected gas station information, and using a first specified number of preliminarily selected gas stations satisfying a refuel-queuing condition as a preselected gas station, the refuel-queuing condition comprising at least one of waiting time for refueling, a distance to the gas station, and time required to reach the gas station;

determining driving route information of the preselected gas station based on the vehicle location information and location information of the preselected gas station; and encapsulating the location information of the preselected gas station, name information of the preselected gas station, the driving route information of the preselected gas station, and the refuel-queuing information of the preselected gas station corresponding to the refuel-queuing condition into the preselected gas station information.

16. The apparatus according to claim 13, wherein the operations further comprise:

sending refueling authorization information, the refueling authorization information comprising the vehicle identification number.

17. An apparatus for automatic refueling of a driverless vehicle, comprising:

at least one processor; and a memory storing instructions, the instructions when executed by the at least one processor, cause the at least one processor to perform operations, the operations comprising:

receiving refueling request information, the refueling request information comprising a vehicle identification number, refueling account information, and refueling amount information;

validating the vehicle identification number in the refueling request information by using received refueling authorization information, and sending refueling permission information if the validation is passed; otherwise, sending alarm information; and refueling the vehicle based on the refueling account information and the refueling amount information after receiving a refueling confirmation message, and sending refueling completion information, wherein the refueling the vehicle based on the refueling account information and the refueling amount information comprises:

checking whether the refueling account information comprises a valid account;

in response to determining that the refueling account information comprises the valid account, checking balance information of the refueling account and refueling the vehicle based on the balance information; and in response to determining that the refueling account information does not comprise the valid account, sending alarm information.

18. The apparatus according to claim 17, wherein the checking balance information of the refueling account and refueling the vehicle based on the balance information comprises:

checking whether an account balance is greater than or equal to an amount corresponding to the refueling amount information;

in response to determining that the account balance is greater than or equal to the amount corresponding to the refueling amount information, refueling the vehicle based on the refueling amount information, and deducting the amount corresponding to the refueling amount information from the account balance; and in response to determining that the account balance is not greater than or equal to the amount corresponding to the refueling amount information, sending alert information indicating that the account needs to be recharged.

* * * * *